Figure 1:
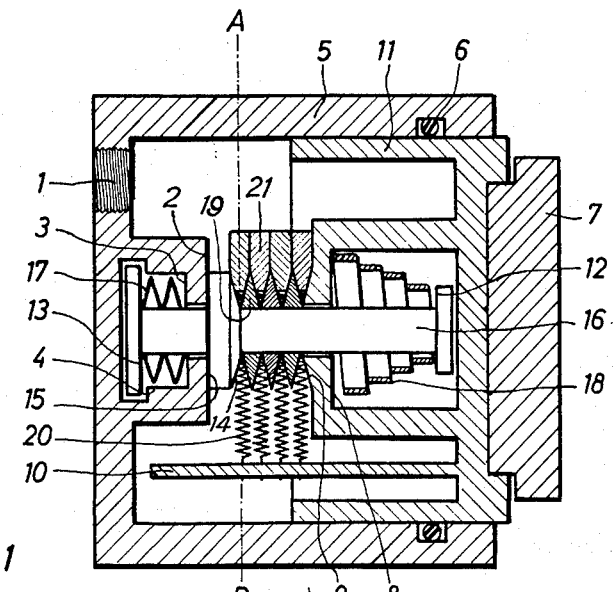

June 14, 1966 KARL-HEINZ GRIESENBROCK 3,255,851
AUTOMATIC ADJUSTING DEVICE FOR HYDRAULICALLY ACTUATED BRAKES
Filed Oct. 1, 1963 3 Sheets-Sheet 1

INVENTOR:
KARL-HEINZ GRIESENBROCK
by
Jacob L. Kollin
ATTORNEY

United States Patent Office 3,255,851
Patented June 14, 1966

3,255,851
AUTOMATIC ADJUSTING DEVICE FOR HYDRAULICALLY ACTUATED BRAKES
Karl-Heinz Griesenbrock, Duisburg, Germany, assignor to Ruhr Intrans Hubstapler G.m.b.H., Muhlheim an der Ruhr, Germany
Filed Oct. 1, 1963, Ser. No. 313,119
2 Claims. (Cl. 188—196)

Automatic adjusting devices for hydraulically actuated brakes act upon either the lever mechanism and the control rods or are accommodated in the hydraulic brake cylinder. The former employ screws which automatically maintain constant the airway by means of a ratchet or prestressed spring pull and thereby equalize the wear of the friction linings. The latter are provided with clamp-like adjusting means at the inner wall of the wheel brake cylinder, which are held by friction and their own elasticity and which effect an equalization of the airway. Adjusting devices installed outside of the brake cylinders are disadvantageous, since they are exposed to mechanical damage and fouling, whereby their function is not certain in use. Particularly disadvantageous in this instance is the fact that the path of adjustment is not presupposed directly through the gear of the friction lining.

The adjusting devices installed interiorly of the brake cylinders are in contact with tensioned friction connections which, during temperature fluctuations and after repeated use, fail to assure equal remaining adjusting force, due to the change and wear of the surfaces serving as the frictional contact. This finally leads to a condition in which the safe space margin of the clamping force of the frictional connection to the return springs is completely reduced and the brake is no longer ventilated.

The invention relates to an independent adjusting device for pressure means actuated brakes, in particular for motor vehicles, which is installed in the brake cylinder, in which the piston is retracted by means of a retracting force and the adjusting elements are actuated outwardly by the movement of the piston over a predetermined air clearance during the wear of the friction lining, and in which the adjusting device, which actually serves as a stop for the piston opposite the cylinder during the intermediate movement of further elements is shortened, whereby the adjusting elements are not subject to wear and thus maintain the adjusting forces in balance. Furthermore, the brake piston guidance by the adjusting elements is not hindered and the adjusting device is not sensitive to temperature influences. Taken as a whole, these individual advantages provide a very great assurance in use, a factor which is of a special significance in the case of brakes.

A further feature of the invention resides in the fact in that elements of the adjusting device are loaded with an axially acting greater blocking force which is effective in the same direction, yet opposed to the return force and provided with a safety space, whereby the adjusting forces remain the same, thus assuring that the safety space is not reduced when the adjustment is increased.

According to one embodiment of the invention, the adjusting elements and the return springs which provide the return force are secured to a bolt which extends into the cylinder as well as into the piston, thus resulting in a simplified construction and an economical solution, due to the combination of return and adjustment.

A further embodiment of the invention resides in the provision of a bolt which has at its predetermined return part a stop for the adjusting elements and on the other side a stop for the spring which actuates the blocking force, whereby while the adjusting is effective only after the complete employment of the airway, the latter is maintained uniformly independent of the use of the brake lining. This feature is particularly advantageous when several brake cylinders are actuated from a common main brake cylinder at the same time.

According to a further embodiment of the invention, adjustable elements are provided between the bolt's stop and the piston connection in the form of key rings having self-checking key surfaces arranged oppositely the actual movement and which are axially displaceable on the bolt and key segments which are also provided with self-checking key surfaces disposed against the axial movement and extending between the key rings and biased by spring tension, thus providing an advantageous construction and an economical solution, since such parts can be pressed out of friction materials and thus do not require any mechanical manipulation.

Another embodiment of the invention resides in the fact that the part of the bolt between the stop and the shoulder is provided with a self-retarding thread disposed against the axial movement and on which there is mounted a nut contacting the shoulder by means of a spiral spring in the direction of rotation, whereby not only a simple construction but also the lubricating effect of the pressure medium is employed in an advantageous manner which is not possible, in contrast, in externally mounted and adjusting devices requiring care.

Finally, according to the invention there is provided a constructional assembly consisting of pistons, bolts, a return device and an adjusting device which is an interrelated unit, whereby it is possible for any untrained person to exchange the worn out and used parts of the brake for new parts of the unit in a fraction of the time required heretofore, without any substantial interruption of use of the motor vehicle and the used units may be put in proper use condition by skilled persons independently of the motor vehicle.

The invention is illustrated in the drawing schematically, by way of example.

Figure 2:
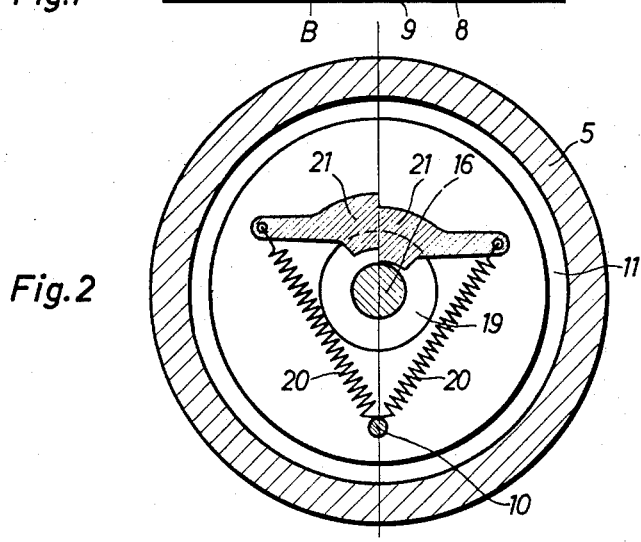
Figure 3:
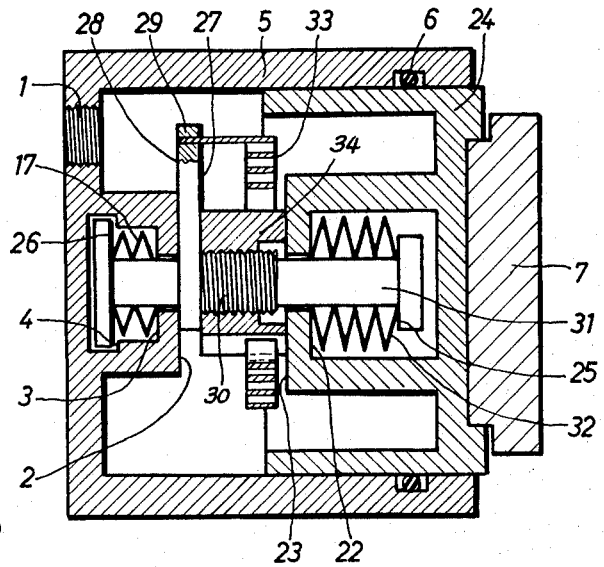
Figure 4:
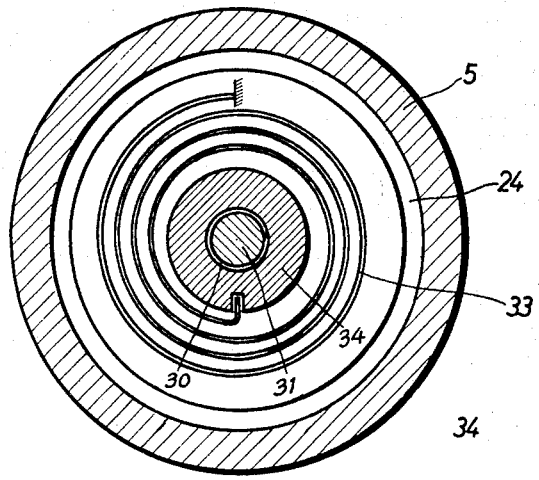
Figure 5:
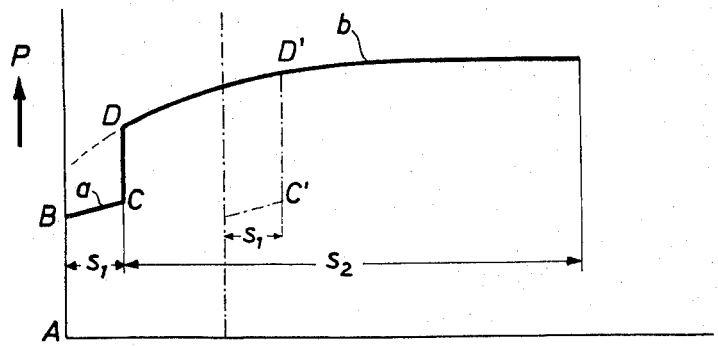

In the drawing:

FIG. 1 is a longitudinal cross-section view of a brake cylinder with key rings and key element adjusting device, FIG. 2 is a cross-section on line A–B of FIG. 1, illustrating the position of a key element left of the middle line in the initial position and on the right of the center line and in the end phase of a possible adjustment, FIG. 3 is a view in cross-section of another brake cylinder with an adjusting device provided with a nut, tensioned by a spiral spring, FIG. 4 is a cross-section taken in the area of the spring and the nut and FIG. 5 is a graph showing the spring characteristics of the return and blocking forces.

Referring now to the figures in detail, there is shown in FIGS. 1 and 2 an enclosure for a pressure medium conductor (not shown) and a cylinder flange having bearing surfaces 2, 3 and 4 of a cylinder 5 sealed by a seal 6, the brake lining 7 and bearing surfaces 8 and 9 as well as a spring holder 10 of a piston 11. Along the common axis of the cylinder 5 and the piston 11 there is provided a bolt 16 with bearing flanges 12 and 13 and intermediate flange having bearing surfaces 14 and 15. Between the flange 13 of bolt 16 and the flange 3 of cylinder 5 there are provided return springs 17 and between the bearing surface 8 of piston 11 and the bearing surface 12 of bolt 16 a spring 18. Between the bearing surface of the piston 11 and the bearing surface 14 of bolt 16 there are slidably mounted on the bolt key rings 19 into which extend key segments 21 biased by springs 20 at the spring holder 10.

In FIGS. 3 and 4 there are shown an enclosure 1a for a pressure medium conductor (not shown) and bearing surfaces 2a, 3a and 4a of the cylinder 5a which is sealed by means of a seal 6a and a piston 24, bearing the brake lining 7a and provided with bearing surfaces 22 and 23.

Along the common axis of cylinder 5a and piston 24 there is disposed a bolt 31 provided at its ends with bearing surfaces 25 and 26 and intermediate these with bearing surfaces 27 and 28 and a spring holder 29, as well as a thread 30. Between the bearing surface 26 of bolt 31 and the bearing surface 3 of cylinder 5 there are provided return springs 17a and between the bearing surface 22 of the piston 24 and the bearing surface 25 of the bolt 31, springs 32. Between the bearing surface 23 of piston 24 and the bearing surface 27 of bolt 31 there is mounted a nut 34 on the thread 30.

In FIG. 5 there are shown the spring characteristics of the return and blocking force in their mutual dependence. The force modulation of the return spring and blocking spring is indicated by P, the distance AB is the required tension of the return spring for overcoming the resisting friction which influences the piston in the cylinder, the distance CD or C'D' the safety space of the blocking force to the return force, the path $s_1$ of the entire working stroke and the airway of the cylinder, the path $s_2$ of the entire adjusting path, a the characteristic of the return spring, b the characteristic of the blocking spring, and the dotted lines the extension of the work and airway in the area of the adjustment.

The device operates as follows:

According to FIGS. 1 and 2 the piston 11 in cylinder 5 is impacted, through the connection 1, by pressure medium for actuating the brake, so that the cylinder 11 and the brake lining 7 are displaced in the direction of a brake disk (not shown) while the springs 18 positioned between the abutting surface 8 of piston 11 and the abutting surface 12 of bolt 16 and whose tension is not changed, and the bolt 16 are taken along with the simultaneous impingement of the return springs 17 positioned between the bolt's bearing surface 13 and the bearing surface 3 of cylinder 5 and with the simultaneous demeshing of bearing surfaces 2 and 15, until the bearing surface 13 of bolt 16 lies against the bearing surface 4 of cylinder 5 and until the brake lining 7 lies against the brake disk. In order to maintain the friction between the brake lining 7 and the brake disk, the wear of the brake lining 7 by the brake operation assures the forward movement of the piston 11 by means of a further impingement of the pressure medium. Since the bolt 16 with its bearing surface 13 is already abutting the bearing surface 4 of the cylinder 5, the further movement of piston 11 effects a compression of spring 18 which is disposed between the bearing surface 12 of the bolt 16 and the bearing surface 8 of the piston 11, whereby the space between the bearing surface 9 of the piston 11 and the bearing surface 14 of the bolt 16 is increased and thus enables the key segments 21 provided with spring 20, to arrive at an equalization of the clearance between the key elements 19 resulting from the increase of the space. In order to complete the brake operation, the impact of the pressure medium is increased, whereby while the position of the bolt 16, the spring 18, the piston 11 and the key rings 19 as well as the key segments 21 does not change with relation to one another, it becomes possible to relax the return springs 17 to such an extent that the bearing surface 15 of bolt 16 contacts the bearing surface 2 of the cylinder 5, whereby in the attained rest position there is the same space between the bearing surface 13 of bolt 16 and the bearing surface 4 of the cylinder 5 just as it was before the beginning of the brake operation. Nothing has changed therewith at the air clearance.

According to FIGS. 3 and 4, the piston 24 inside the cylinder 5 is displaced by pressure medium, whereby the piston 24 with the brake lining 7 moves in the direction of a brake disk (not shown), so that due to the spring 32 located between the bearing surfaces 22 of piston 24 and the bearing surface 25 of bolt 31, the amount of tension of which spring is at the same time unchanged, the bolt 31 is emplaced at the bearing surface 4 of cylinder 5 and up to the brake lining 7 at the brake disk, while simultaneously contacting the return spring 17 which is located between the bearing surface 26 and the bearing surface 3 of the cylinder 5, and the simultaneous demeshing of the bearing surfaces 2 and 28, until the contact of the bearing surface 26 of bolt 31 with the bearing surface 4 of cylinder 5 and until the brake lining 7 emplaced on the brake disk, is taken along. The wear of the brake lining 7 during the operation of the brake conditions the movement of the piston 24 through the further impact of the pressure medium in order to maintain the friction contact between the brake lining 7 and the brake disk. Since the bolt 31 with its bearing surface 26 already contacts the bearing surface 4 of the cylinder, the further movement of the piston 24 effects a mutual pressure of springs 32 positioned between the bearing surface 25 of the bolt 31 and the bearing surface 22 of the bolt 24, whereby the space between the bearing surface 23 of the piston 24 and the bearing surface 27 of bolt 31 increased and thereby enables the nut 34 covered with the spring 33 to turn, due to the clearance obtained by the increase of space, until an equalization on the thread 30 of bolt 31 until it meets with its rear side the bearing surface 23 of piston 24. Due to the interlocking of the rear side of nut 34 and the bearing surface 27 of bolt 31, a space is formed which is not independently adjustable. In order to complete the brake action, the impact of the pressure medium is increased, so that while the positions of bolt 31, springs 32, the piston 24 and the nuts 34 as well as of the spiral spring 33, do not change with relation to one another, the return spring 17 is enabled to stretch to such an extent that the bearing surface 26 of bolt 31 contacts the bearing surface 4 of cylinder 5, whereby in the rest position thus achieved the same distance exists between the bearing surface 26 of bolt 31 and the bearing surface 4 of cylinder 5, which existed before the introduction of the brake operation. Nothing has thereby changed with respect to the air clearance.

Obviously instead of the key segments acting in the direction of the bolts may be employed, with an appropriate shaping of the key rings, oppositely operating key segments and the like.

What I claim is:

1. Automatic adjusting device for pressure medium actuated brakes of motor vehicles, comprising, a cylinder having an open end and a closed end provided with a hollow cylinder flange directed inwardly of said cylinder; a piston slidable in said cylinder, said piston having a skirt portion provided with a bearing flange directed towards the closed end of said cylinder; a bolt displaceable axially of said cylinder flange and said piston, said bolt being provided with end flanges and an intermediate flange; a first return spring in said hollow cylinder flange disposed between said cylinder flange and one end flange of said bolt; a second spring disposed between said piston's bearing flange and the other flange of said bolt; a plurality of key rings slidably mounted on said bolt between said piston's bearing flange and said bolt's intermediate flange; a plurality of key segments extending into said key rings; spring means for biasing said segments against said key rings and a brake lining secured to said piston's closed end exteriorly of said piston.

2. For use with a fluid pressure actuated brake, an automatic adjuster comprising a cylinder having an open end, a closed end and a hollow cylinder flange connected to the said closed end, the said flange including first and second bearing surfaces, a piston slidably disposed in the said cylinder, the said piston having a bearing flange directed towards the closed end of the said cylinder, a bolt disposed between said cylinder and piston and displaceable axially thereof, the said bolt being provided with a pair of end flanges and an intermediate flange, a first return spring disposed in the said hollow cylinder flange between the said one bearing surface and one of the said end flanges for biasing the said intermediate flange into abutment with the said second bearing surface, a second return spring disposed between the said bearing flange and the other of the said end flanges, a plurality of wedge shaped rings carried by the said bolt and slidable axially thereof, the said rings being disposed between the said bearing flange and the said intermediate flange, a plurality of wedge shaped segments interleaved with the said rings so that radially inward movement of the said segments relative to the said rings tends to force the said rings apart axially, and spring means connected to the said segments for biasing the said segments radially inward relative to the said rings.

References Cited by the Examiner

UNITED STATES PATENTS 2,196,799 4/1940 Keplinger.
2,900,052 8/1959 Frayer et al. _____ 188—196 X

FOREIGN PATENTS 631,880 11/1949 Great Britain.

MILTON BUCHLER, *Primary Examiner.*
DUANE A. REGER, *Examiner.*